(12) United States Patent
Kim et al.

(10) Patent No.: US 8,654,280 B2
(45) Date of Patent: Feb. 18, 2014

(54) BI-STABLE CHIRAL SPLAY NEMATIC MODE LIQUID CRYSTAL DISPLAY DEVICE

(75) Inventors: Dong-Guk Kim, Goyang-si (KR); Wook-Sung Kim, Goyang-si (KR)

(73) Assignee: LG Display Co., Ltd, Seoul (KR)

( * ) Notice: Subject to any disclaimer, the term of this patent is extended or adjusted under 35 U.S.C. 154(b) by 113 days.

(21) Appl. No.: 13/099,922

(22) Filed: May 3, 2011

(65) Prior Publication Data
US 2011/0267564 A1 Nov. 3, 2011

(30) Foreign Application Priority Data
May 3, 2010 (KR) ........................ 10-2010-0041191

(51) Int. Cl.
*G02F 1/1333* (2006.01)
*G02F 1/1343* (2006.01)

(52) U.S. Cl.
USPC ............................. 349/86; 349/141; 349/122

(58) Field of Classification Search
USPC ......................................................... 349/141
See application file for complete search history.

(56) References Cited

U.S. PATENT DOCUMENTS

| | | | |
|---|---|---|---|
| 7,414,690 B1 * | 8/2008 | Lu et al. ........................ | 349/141 |
| 7,773,182 B2 * | 8/2010 | Kimura et al. ............... | 349/141 |
| 2007/0153175 A1 * | 7/2007 | Chang et al. .................. | 349/114 |
| 2007/0242203 A1 * | 10/2007 | Lee et al. ...................... | 349/141 |
| 2008/0018850 A1 * | 1/2008 | Shih et al. ..................... | 349/152 |
| 2010/0002158 A1 * | 1/2010 | Ishihara et al. ................ | 349/33 |
| 2010/0157186 A1 * | 6/2010 | Kim et al. ....................... | 349/39 |
| 2011/0069270 A1 * | 3/2011 | Shimura et al. ............... | 349/141 |

OTHER PUBLICATIONS

Jhun et al., "Tristate Liquid Crystal Display with Memory and Dynamic Operating Modes," Appl. Phys. Lett. 89, 123507 (2006).*

* cited by examiner

*Primary Examiner* — Bumsuk Won
*Assistant Examiner* — Ryan Crockett
(74) *Attorney, Agent, or Firm* — Brinks Gilson & Lione

(57) ABSTRACT

A bi-stable chiral splay nematic mode liquid crystal display device includes: first and second substrates facing and spaced apart from each other; a gate line and a data line on an inner surface of the first substrate; a thin film transistor connected to the gate line and the data line; a reflecting plate on the thin film transistor, the reflecting plate including an embossing pattern; a first passivation layer including a flat top surface on the reflecting plate; a first electrode on the first passivation layer; a second passivation layer on the first electrode; at least one second electrode and at least one third electrode on the second passivation layer; a fourth electrode on an inner surface of the second substrate; and a liquid crystal layer including bi-stable chiral splay nematic liquid crystal molecules between the first and second substrates.

14 Claims, 10 Drawing Sheets splay state

π-twist state

BI-STABLE CHIRAL SPLAY NEMATIC MODE LIQUID CRYSTAL DISPLAY DEVICE

This application claims the benefit of Korea Patent Application No. 10-2010-0041191, filed on May 3, 2010, the entire contents of which is incorporated herein by reference for all purposes as if fully set forth herein.

BACKGROUND

1. Field of the Invention

The present disclosure relates to a liquid crystal display device, and more particularly, to a bi-stable chiral splay nematic mode liquid crystal display device having a reflective type or a transflective type.

2. Discussion of the Related Art

As the information age progresses, display devices having superiorities of thin profile, light-weight and low power consumption have been required, and flat panel display (FPD) devices have been widely developed. Specifically, a liquid crystal display (LCD) device has been widely used for a notebook or a monitor of a desktop computer because of its superiorities in resolution, color displaying and display quality.

In general, the LCD device includes two facing substrates having their respective electrodes and a liquid crystal layer between the two substrates. An electric field is generated by applying voltages to the electrodes, and liquid crystal molecules in the liquid crystal layer are re-aligned by the electric field. As a result, transmittance of the liquid crystal layer is changed and the LCD device displays images.

FIG. 1 is an exploded perspective view showing a liquid crystal display device according to the related art. In FIG. 1, the liquid crystal display (LCD) device includes an array substrate 10, a color filter substrate 20 and a liquid crystal layer 30 between the array substrate 10 and the color filter substrate 20. The array substrate 10 includes a first substrate 12, a plurality of gate lines 14 on the first substrate 12, a plurality of data lines 16 crossing the plurality of gate lines 14 to define a pixel region P, a thin film transistor (TFT) Tr connected to the gate line 14 and the data line 16 and a pixel electrode 18 connected to the TFT Tr.

In addition, the color filter substrate 20 facing the array substrate 10 includes a second substrate 22, a black matrix 25 blocking a non-display area corresponding to the gate line 14, the data line 16 and the TFT Tr, a color filter layer 26 including red, green and blue color filters 26a, 26b and 26c each corresponding to the pixel region P and a common electrode 28 on an entire surface of the second substrate 22.

Although not shown in FIG. 1, a seal pattern may be formed in a boundary portion between the array substrate 10 and the color filter substrate 20 for preventing leakage of the liquid crystal layer 30. A lower orientation film may be formed between the array substrate 10 and the liquid crystal layer 30 and an upper orientation film may be formed between the color filter substrate 20 and the liquid crystal layer 30 for aligning the liquid crystal layer initially. Further, first and second polarizing plates may be formed on outer surfaces of the first and second substrates 12 and 22, respectively.

A backlight unit may be disposed under the array substrate 10 to supply light. When a gate signal turning on the TFT Tr is sequentially supplied the plurality of gate lines 14, the TFT Tr is turned on and a data signal supplied to the plurality of data lines 16 is applied to the pixel electrode 18 through the TFT Tr. As a result, a vertical electric field is generated between the pixel electrode 18 and the common electrode 28 and liquid crystal molecules in the liquid crystal layer 30 are re-aligned by the vertical electric field, thereby the LCD device displaying images due to transmittance change of the liquid crystal layer 30.

The liquid crystal layer 30 may have one of a nematic liquid crystal molecule, a smectic liquid crystal molecule and a cholesteric liquid crystal molecule. The nematic liquid crystal molecule having a strong scattering property in random alignment has been widely used for the LCD device. An electro optic effect of the liquid crystal means a change of optical properties due to an electric field. For example, an alignment of the liquid crystal molecules may be changed by an electric field. An alignment of the nematic liquid crystal molecules may be sequentially changed according to an electric field, and the LCD device including the nematic liquid crystal molecules may generally have a twisted nematic (TN) mode or a super twisted nematic (STN) mode.

In the TN mode LCD device, the liquid crystal molecules adjacent to the pixel electrode and the common electrode are initially oriented to be parallel to the pixel electrode and the common electrode, and a long axis of the liquid crystal molecule adjacent to the pixel electrode and a long axis of the liquid crystal molecule adjacent to the common electrode make a twist angle of about 90°.

In the STN mode LCD device, the liquid crystal molecules adjacent to the pixel electrode and the common electrode are initially oriented to be parallel to the pixel electrode and the common electrode, and a long axis of the liquid crystal molecule adjacent to the pixel electrode and a long axis of the liquid crystal molecule adjacent to the common electrode make a twist angle of about 180° or 360°.

Recently, the LCD devices of various modes have been suggested to satisfy various users' needs. Specifically, an E-book or an E-paper, where a fixed image such as a text or a photograph is displayed for a relatively long time period without changes, has been the subject of research and development. When the TN mode LCD device or the STN mode LCD device is applied to the E-book or the E-paper, a relatively high power is unnecessarily consumed for displaying a fixed image during a relatively long time period as for displaying a moving image. In addition, since the transmissive type LCD device requires a backlight unit, the E-book or the E-paper using the transmissive type LCD device has disadvantages in light-weight, thin profile and low power consumption. As a result, an LCD device applicable to an E-book or an E-paper with lower power consumption has been required.

BRIEF SUMMARY

A bi-stable chiral splay nematic mode liquid crystal display device includes: first and second substrates facing and spaced apart from each other, the first and second substrates including a display area and a non-display area surrounding the display area; a gate line and a data line on an inner surface of the first substrate, the gate line and the data line crossing each other with a gate insulating layer interposed between the gate line and the data line to define a pixel region; a thin film transistor connected to the gate line and the data line; a reflecting plate on the thin film transistor, the reflecting plate including an embossing pattern; a first passivation layer on the reflecting plate, the first passivation layer including a flat top surface; a first electrode on the first passivation layer in the pixel region, the first electrode having a plate shape and connected to the thin film transistor; a second passivation layer on the first electrode; at least one second electrode and at least one third electrode on the second passivation layer, the at least one second electrode and the at least one third electrode passing through the pixel region and spaced apart from each other; a fourth electrode on an inner surface of the second substrate; and a liquid crystal layer between the first and second substrates, the liquid crystal layer including bi-stable chiral splay nematic liquid crystal molecules.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings. Wherever possible, similar reference numbers will be used to refer to the same or similar parts.

Figure 2:
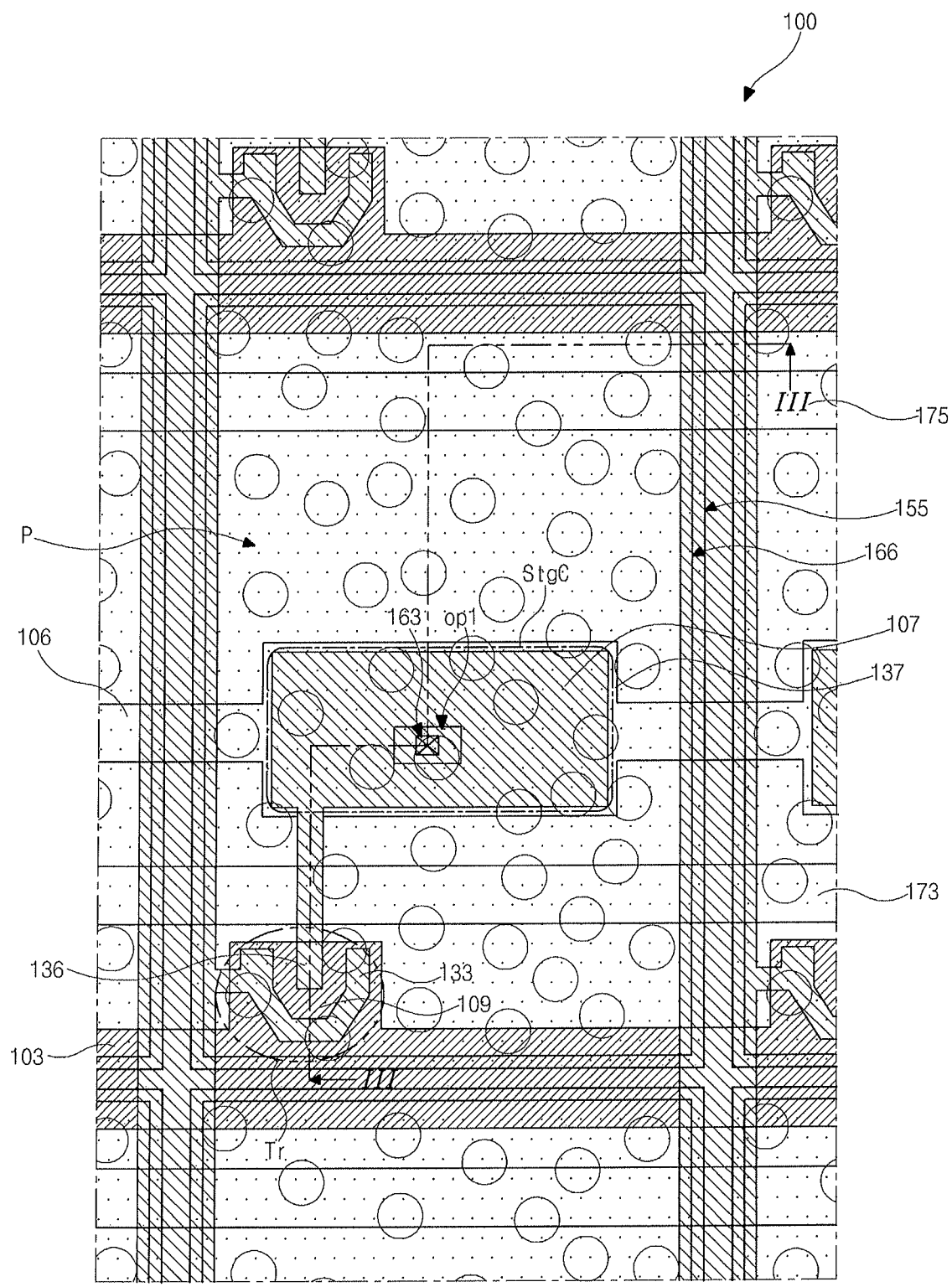
FIG. 2 is a plan view showing a reflective bi-stable chiral splay nematic mode liquid crystal display device according to a first embodiment of the present invention.
Figure 3:
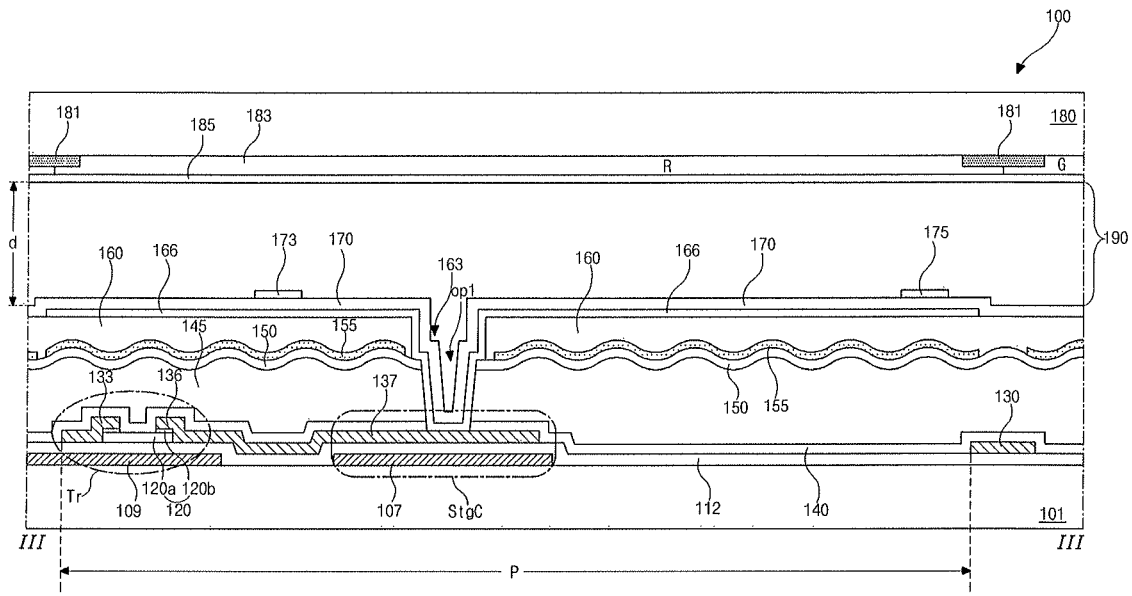
FIG. 3 is a cross-sectional view taken along line of FIG. 2.

FIG. 2 is a plan view showing a reflective bi-stable chiral splay nematic mode liquid crystal display device according to a first embodiment of the present invention, and FIG. 3 is a cross-sectional view taken along line III-III of FIG. 2.

In FIGS. 2 and 3, a reflective bi-stable chiral splay nematic (BCSN) mode liquid crystal display (LCD) device 100 includes a first substrate 101, a second substrate 180 and a liquid crystal layer 190 between the first and second substrates 101 and 180. The first and second substrates 101 and 180 facing and spaced apart from each other include a plurality of pixel regions P. A thin film transistor Tr, a first electrode 166, a second electrode 173, a third electrode 175 and a reflecting plate 155 are formed on an inner surface of the first substrate 101, and a fourth electrode 185 is formed on an inner surface of the entire second substrate 180. The reflecting plate 155 has an embossing pattern, and the fourth electrode 185 includes a transparent material. In addition, the liquid crystal layer 190 includes BCSN liquid crystal molecules.

The first substrate 101 may be formed of transparent glass, flexible transparent plastic or flexible transparent film. A gate line 103, a gate insulating layer 112 and a data line 130 are sequentially formed on the inner surface of the first substrate 101. The gate line 103 and the data line 130 cross each other to define a pixel region P. A common line 106 parallel to the gate line 103 is formed on the first substrate 101. The common line 106 may be disposed to pass through the pixel region P. A portion of the common line 106 has a width greater than the other portion to constitute a first capacitor electrode 107.

The thin film transistor (TFT) Tr including a gate electrode 109, a gate insulating layer 112, a semiconductor layer 120, a source electrode 133 and a drain electrode 136 is connected to the gate line 103 and the data line 130. The gate electrode 109 is connected to the gate line 103, and the gate insulating layer 112 is formed on the gate electrode 109 and the gate line 103. The semiconductor layer 120 includes an active layer 120a of intrinsic silicon and an ohmic contact layer 120b of impurity-doped silicon. The source and drain electrodes 133 and 136 are formed on the semiconductor layer 120 and are spaced apart from each other. The source electrode 133 is connected to the data line 130, and the drain electrode 136 extends to overlap the first capacitor electrode 107. The extending portion of the drain electrode 136 overlapping the first capacitor electrode 107 functions as a second capacitor electrode 137 such that the first capacitor electrode 107, the second capacitor electrode 137 and the gate insulating layer 112 between the first and second capacitor electrodes 107 and 137 constitute a storage capacitor StgC.

A first passivation layer 140 of an inorganic insulating material is formed on the TFT Tr, the storage capacitor StgC and the data line 130, and a second passivation layer 145 of an organic insulating material is formed on the first passivation layer 140. The second passivation layer 145 has an uneven pattern on a top surface thereof. A third passivation layer 150 of an inorganic insulating material is formed on the second passivation layer 145, and the reflecting plate 155 of a metallic material is formed on the third passivation layer 150. For example, the metallic material having a relatively high reflectance may include aluminum (Al) or aluminum (Al) alloy. The reflecting plate 155 may be formed to overlap the gate line 103 and the data line 130. Each of the third passivation layer 150 and the reflecting plate 155 has an embossing pattern on a top surface thereof due to the uneven pattern of the second passivation layer 145. Since a mirror reflection is prevented and a reflection efficiency is improved due to the embossing pattern of the reflecting plate 155, a visibility of the reflective BCSN mode LCD device 100 is improved.

In addition, the first to third passivation layers 140, 145 and 150 have a drain contact hole 163 exposing the drain electrode 136, and the reflecting plate 155 has a first opening op1 corresponding to the drain contact hole 163.

The first passivation layer 140 of the inorganic material is formed to prevent contamination of a channel region of the active layer 120a and deterioration of the TFT Tr by the organic material for the second passivation layer 145. Further, the third passivation layer 150 of the inorganic material is formed to improve adhesion between the organic material for the second passivation layer 145 and the metallic material for the reflecting plate 155. Although the first to third passivation layers 140, 145 and 150 are formed on the first substrate 101 in the first embodiment, the first and third passivation layer 140 and 150 may be omitted and only the second passivation layer 145 may be formed between the TFT Tr and the reflecting plate 155 in another embodiment.

A fourth passivation layer 160 is formed on the reflecting plate 155. The fourth passivation layer 160 may be formed of one of an organic insulating material and an inorganic insulating material and may have a thickness greater than about 1 μm so that the fourth passivation layer 150 can function as a planarization layer having a flat top surface regardless of the step differences of the lower laminated layers. Since the step differences due to the embossing pattern of the reflecting plate 155 are planarized by the fourth passivation layer 160, the liquid crystal layer 190 has a uniform thickness.

Figure 1:
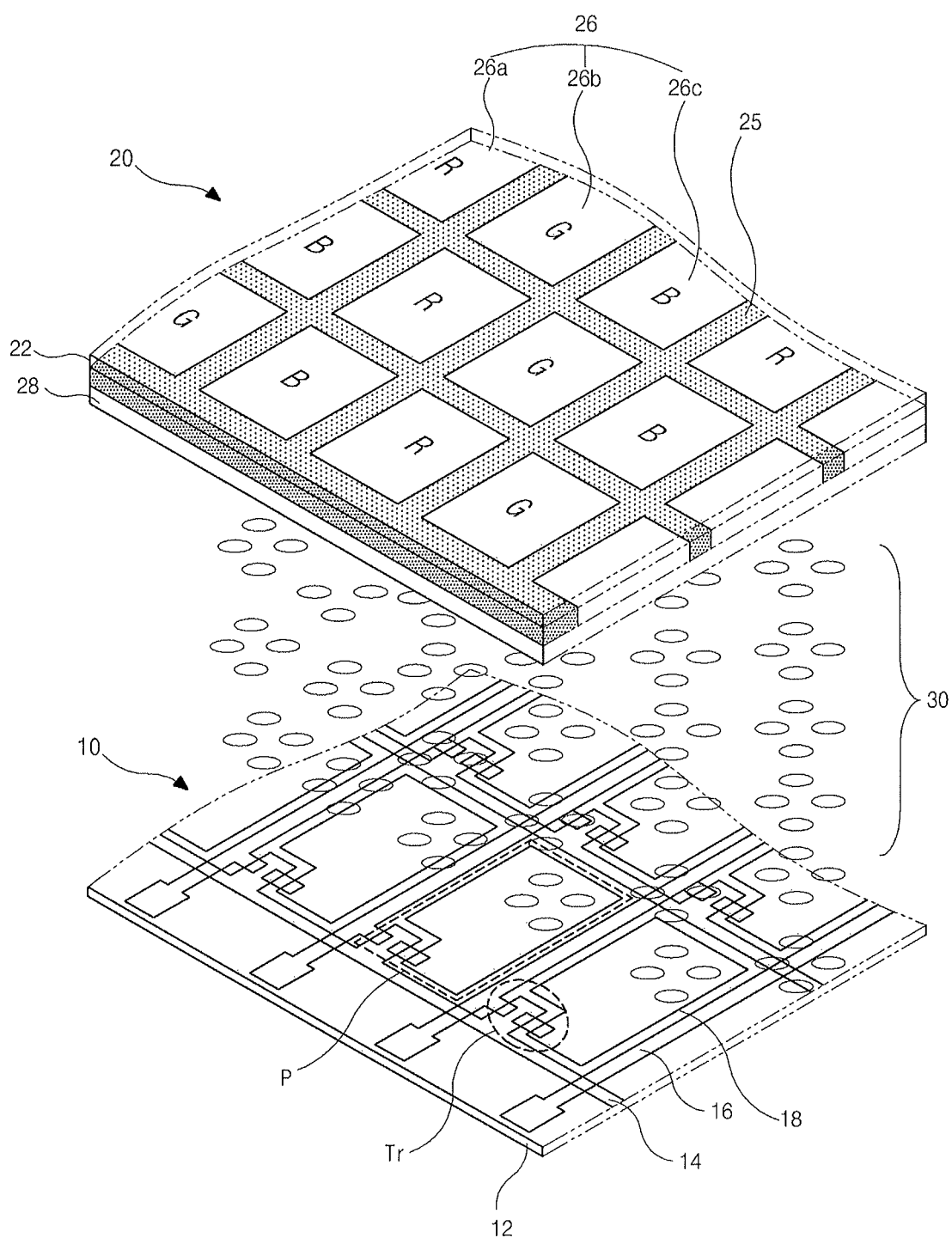
FIG. 1 is an exploded perspective view showing a liquid crystal display device according to the related art.

Although not shown in FIGS. 1 and 2, when the fourth passivation layer 160 is formed of an organic insulating material, a fifth passivation layer may be formed between the reflecting plate 155 and the fourth passivation layer 160 to improve adhesion of the metallic material for the reflecting plate 155 and the organic insulating material for the fourth passivation layer 160.

The drain contact hole 163 is formed in the first to fourth passivation layers 140, 145, 150 and 160. When the fifth passivation layer is formed between the reflecting plate 155 and the fourth passivation layer 160, the drain contact hole 163 may be formed in the first to fifth passivation layers. The drain contact hole 163 corresponds to the first opening op1 of the reflecting plate 155 and exposes the second capacitor electrode 137 extending from the drain electrode 136.

The first electrode 166 of a transparent conductive material is formed on the fourth passivation layer 160. The first electrode 166 is connected to the second capacitor electrode 137 through the drain contact hole 163 and the transparent conductive material may include indium-tin-oxide (ITO) and indium-zinc-oxide (IZO). Further, the first electrode 166 has a plate shape in the pixel region P and may completely overlap the reflecting plate 155.

A sixth passivation layer 170 of an inorganic insulating material is formed on the first electrode 166, and the second and third electrodes 173 and 175 of a transparent conductive material are formed on the sixth passivation layer 170. The second and third electrodes 173 and 175 spaced apart from each other may be disposed to be parallel to the gate line 103 and pass through the pixel region P. The transparent conductive material may include indium-tin-oxide (ITO) and indium-zinc-oxide (IZO).

Although the single second electrode 173 and the single third electrode 175 are formed in each pixel region P in the first embodiment, a plurality of second electrodes and a plurality of third electrodes alternately disposed with each other may be formed in each pixel region P in another embodiment. For example, the number of the plurality of second electrodes in each pixel region P may be one of 4, 6, 8 and 10 and the number of the plurality of third electrodes in each pixel region P may be one of 4, 6, 8 and 10.

The second electrode 173 in each pixel region P of a display area may be connected to a first auxiliary line (not shown) in a non-display area and a first voltage may be supplied to the second electrode 173 through the first auxiliary line. Further, the third electrode 175 in each pixel region P of the display area may be connected to a second auxiliary line (not shown) in the non-display area and a second voltage different from the first voltage may be supplied to the third electrode 175 through the second auxiliary line.

Although not shown in FIGS. 1 and 2, a first orientation film is formed on the first and second electrodes 173 and 175 and the sixth passivation layer 170 exposed through the first and second electrodes 173 and 175. The first orientation film may correspond to the entire display area.

In addition, a black matrix 181 having an open portion is formed on the inner surface of the second substrate 180. The black matrix 181 corresponds to a boundary portion of the pixel region P. For example, the black matrix 181 may correspond to the gate line 103 and the data line 130. A color filter layer 183 is formed on the black matrix 181 and the inner surface of the second substrate 180 exposed through the open portion of the black matrix 181. The color filter layer 183 may include red, green and blue color filters each corresponding to the pixel region P. The fourth electrode 185 of a transparent conductive material is formed on the color filter layer 183. The fourth electrode 185 has a flat top surface so that the step differences due to the black matrix 181 and the color filter layer 183 can be planarized. Although not shown in FIGS. 1 and 2, a second orientation film corresponding to the entire display area is formed on the fourth electrode 185.

The liquid crystal layer 190 including the BCSN liquid crystal molecules is formed between the first and second orientation films. The BCSN liquid crystal molecules may have a bi-stable property and may be formed by adding a chiral dopant to nematic liquid crystal molecules.

In the reflective BCSN mode LCD device 100, since the step differences due to the embossing pattern of the reflecting plate 155 are planarized by the fourth passivation layer 160, the liquid crystal layer 190 has a uniform thickness and deterioration in the bi-stable property of the liquid crystal layer 190 is prevented.

FIGS. 4A to 4D are cross-sectional views showing states of a liquid crystal layer of a bi-stable chiral splay nematic mode liquid crystal display device according to a first embodiment of the present invention. For convenience of illustration, FIGS. 4A to 4D show first to third electrodes on a reflecting plate of a first substrate, a fourth electrode of a second substrate and a liquid crystal layer.

In FIG. 4A to 4D, the BCSN mode LCD device includes the first and second substrates 101 and 180 facing and spaced apart from each other and the liquid crystal layer 190 between the first and second substrates 101 and 180. The liquid crystal layer 190 includes the BCSN liquid crystal molecules 190.

The first electrode 166 is formed over the inner surface of the first substrate 101. The sixth passivation layer 170 is formed on the first electrode 166, and the second and third electrodes 173 and 175 are formed on the sixth passivation layer 170. The fourth electrode 185 is formed over the inner surface of the second substrate 180.

Although not shown in FIGS. 4A to 4D, the first orientation film is formed on the second and third electrodes 173 and 175, and the second orientation film is formed on the fourth electrode 185. The first and second orientation films may be aligned to have the same orientation direction and predetermined pre-tilt angles.

Figure 4A:
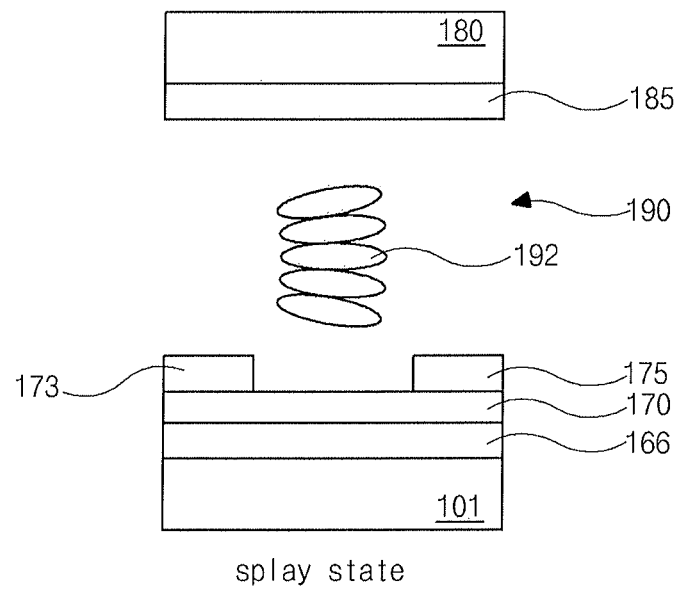
FIGS. 4A to 4D are cross-sectional views showing states of a liquid crystal layer of a bi-stable chiral splay nematic mode liquid crystal display device according to a first embodiment of the present invention.

In FIG. 4A, when no voltage is applied to the first to fourth electrodes 166, 173, 175 and 185, a long axis of the BCSN liquid crystal molecules 192 is disposed along the orientation direction of the first and second orientation films and the liquid crystal layer 190 has a splay state of bi-stable states where the long axes of the BCSN liquid crystal molecules 192 are nearly parallel to the first and second substrates 101 and 180 and are gradually tilted due to the predetermined pre-tilt angles. In the splay state, the BCSN liquid crystal molecules 192 may have a twist angle of about 0°.

Figure 4B:
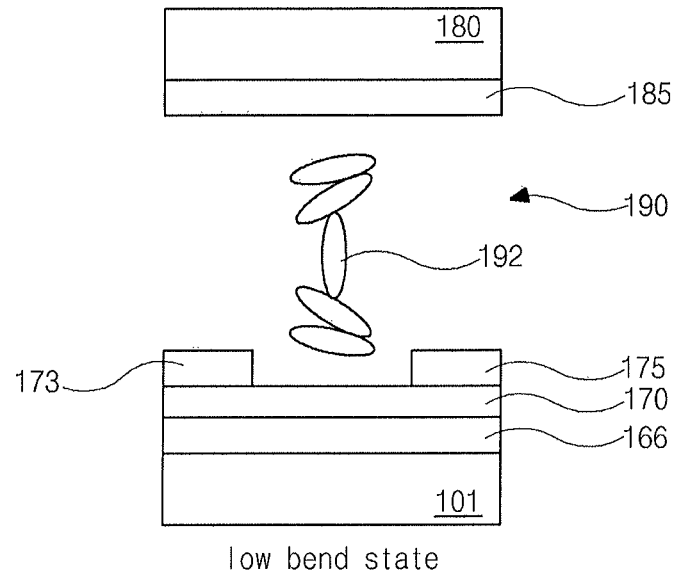
Figure 4C:
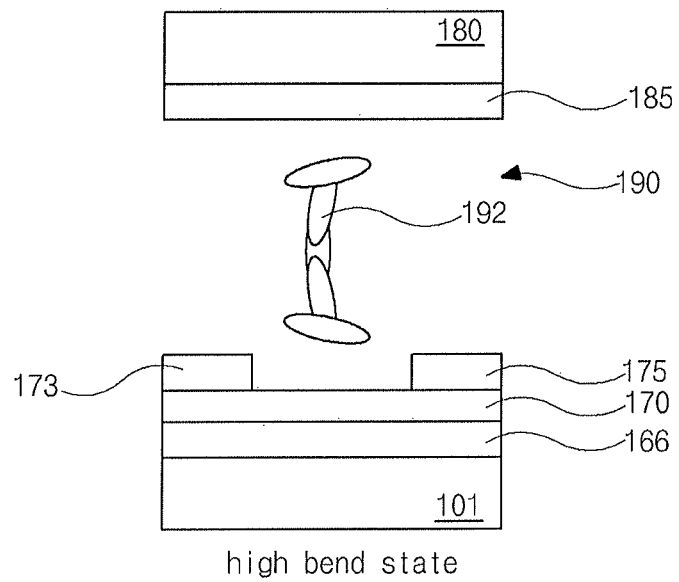

In FIGS. 4B and 4C, when first and fourth voltages different from each other are applied to the first and fourth electrodes 166 and 185, respectively, the vertical electric field is generated between the first and fourth electrodes 166 and 185 and the liquid crystal layer 190 transitions from the splay state to a bend state where the long axes of some of the BCSN liquid crystal molecules 192 are disposed along a vertical electric field to be perpendicular to the first and second substrates 101 and 180. For example, when the difference between the first and fourth voltages is smaller than a reference voltage, the liquid crystal layer 190 may transition to a low bend state. Further, when the difference between the first and fourth voltages is greater than the reference voltage, the liquid crystal layer 190 may transition to a high bend state through the low bend state. As the liquid crystal layer 190 transitions to the high bend state, most of the BCSN liquid crystal molecules 192 rise along the vertical electric field such that the long axes of the BCSN liquid crystal molecules 192 are re-aligned along the vertical electric field. As a result, tilt angles of the BCSN liquid crystal molecules are changed according to the vertical electric field in the bend state.

Figure 4D:
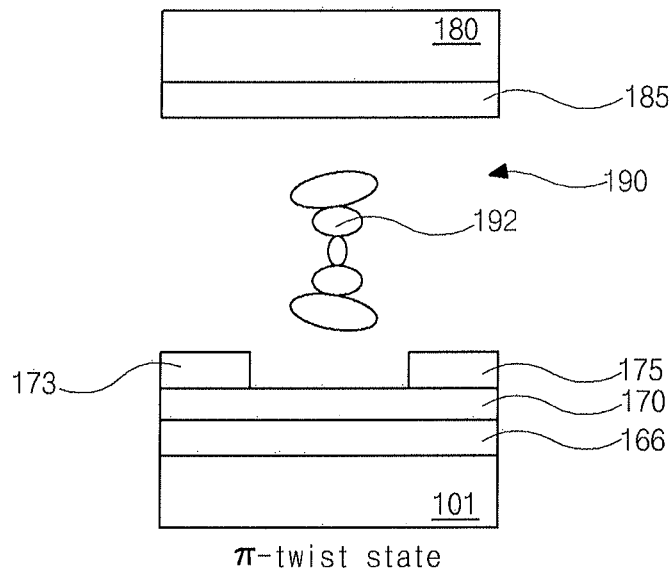

In FIG. 4D, when the first and fourth voltages are removed such that the first and fourth electrodes 166 and 185 are electrically floating, the liquid crystal layer 190 transitions from the high bend state to a π-twist state of the bi-stable states where the long axes of the BCSN liquid crystal molecules 192 are twisted by about 180° along a thickness direction of the liquid crystal layer 190 and are disposed to be parallel to the first and second substrates 101 and 180. In the π-twist state, the BCSN liquid crystal molecules 192 have a twist angle of about 180°.

Since the π-twist state is one of the bi-stable states, the liquid crystal layer 190 of the π-twist state has a memory property such that the BCSN liquid crystal molecules 192 do not transition to the other states and keep the π-twist state without the first and fourth voltages, i.e., even when the vertical electric field is removed.

When second and third voltages different from each other are applied to the second and third electrodes 173 and 175, respectively, a horizontal electric field is generated between the second and third electrodes 173 and 175 and the liquid crystal layer 190 transitions from the π-twist state to the splay state. Since the splay state is one of the bi-stable states, the liquid crystal layer 190 of the splay state has a memory property such that the BCSN liquid crystal molecules 192 do not transition to the other states and keep the splay states till the first and fourth voltages are applied.

Since each of the splay state and the π-twist state is one of the bi-stable states, the BCSN liquid crystal molecules 193 in each of the splay state and the π-twist state keep the previous state without continuous applied voltages. Accordingly, the BCSN mode LCD device displays a fixed image for a relatively long time without continuous applied voltages by using each of the splay state and the π-twist state as one of a black and a white. As a result, power consumption of the BCSN mode LCD device is reduced. For example, the BCSN mode LCD device may be used for an E-book or an E-paper where a fixed image such as a text or a photograph is displayed for several seconds to several hours. Since the BCSN mode LCD device displays the fixed image without continuous supply of voltages, an E-book or an E-paper using the BCSN mode LCD device may display the fixed image without additional power consumption and may be carried for a relatively long time without recharging.

Moreover, since the reflective BCSN mode LCD device 100 (of FIGS. 2 and 3) does not require a backlight unit due to the reflecting plate 155 (of FIGS. 2 and 3), an E-book or an E-paper using the reflective BCSN mode LCD device 100 may have light-weight and thin profile and power consumption of an E-book or an E-paper using the reflective BCSN mode LCD device 100 may be further reduced.

In the reflective BCSN mode LCD device 100, a uniform cell gap d (of FIG. 3), i.e., a uniform thickness of the liquid crystal layer 190 is required to obtain a stable memory property such that the splay state and the π-twist state are kept stably. The BCSN liquid crystal molecules 192 of the liquid crystal layer 190 may be formed by adding chiral dopants to nematic liquid crystal molecules. The BCSN liquid crystal molecules 192 has a twist property due to the chiral dopants and a rotational pitch of the BCSN liquid crystal molecules 192 may be adjusted by an amount of the chiral dopants. The rotational pitch is defined by a distance for a single revolution of the BCSN liquid crystal molecule 192, i.e., a distance from the BCSN liquid crystal molecule 192 having a twist angle of about 0° to the BCSN liquid crystal molecule 192 having a twist angle of about 360°.

When the reflective BCSN mode LCD device 100 has a ratio d/p of cell gap d to pitch p within a range of about 0.22 to about 0.28, the bi-stable property is stably obtained. Specifically, the reflective BCSN mode LCD device 100 where a ratio d/p of cell gap d to pitch p is about 2.5 has the most stable bi-stable property. Accordingly, when the reflective BCSN mode LCD device 100 has a ratio d/p of cell gap d to pitch p within about 0.22 to about 0.28, the splay stat and the π-twist state of the liquid crystal layer 190 are stably kept for a relatively long time. However, when the reflective BCSN mode LCD device 100 has a ratio d/p of cell gap d to pitch p smaller than about 0.22 or greater than about 0.28, the splay stat and the π-twist state of the liquid crystal layer 190 are kept for a relatively short time.

Figure 5A:
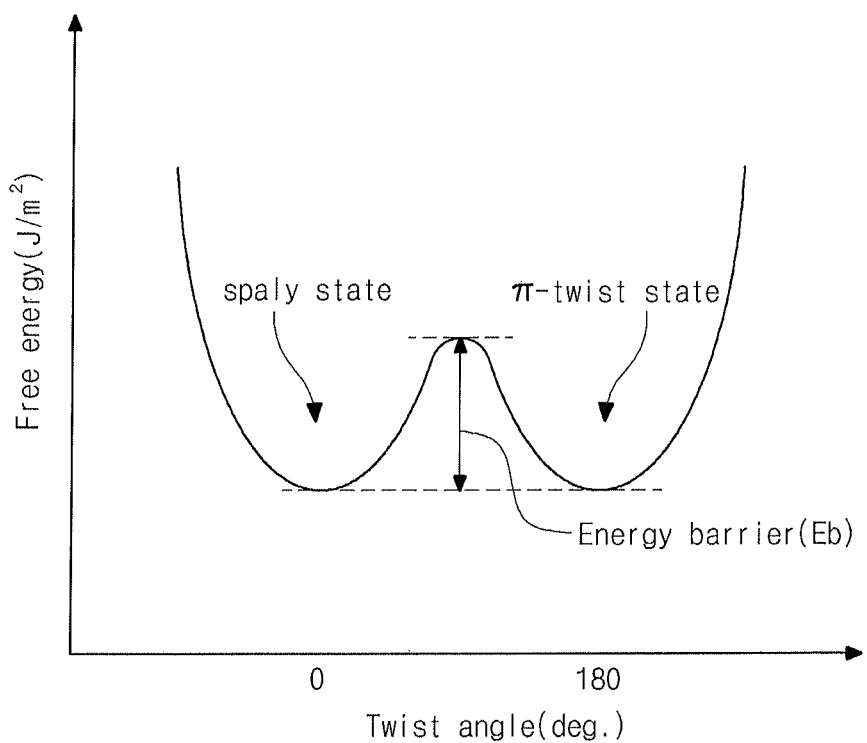
FIG. 5A is a graph showing a free energy with respect to a twist angle of a bi-stable chiral splay nematic mode liquid crystal display device according to a first embodiment of the present invention.
Figure 5B:
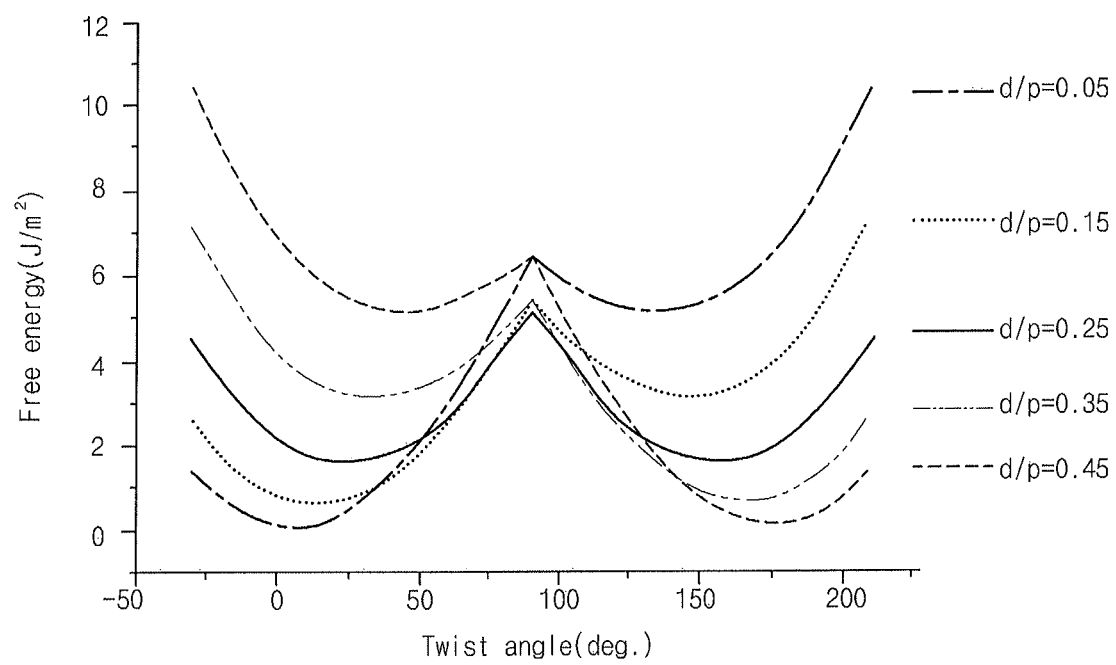
FIG. 5B is a graph showing free energies of various ratios of a cell gap to a pitch with respect to a twist angle of a bi-stable chiral splay nematic mode liquid crystal display device according to a first embodiment of the present invention.

FIG. 5A is a graph showing a free energy with respect to a twist angle of a bi-stable chiral splay nematic mode liquid crystal display device according to a first embodiment of the present invention, and FIG. 5B is a graph showing free energies of various ratios of a cell gap to a pitch with respect to a twist angle of a bi-stable chiral splay nematic mode liquid crystal display device according to a first embodiment of the present invention.

In FIG. 5A, when the reflective bi-stable chiral splay nematic (BCSN) mode liquid crystal display (LCD) device 100 (of FIG. 3) has a ratio d/p of cell gap d to pitch p within a range of about 0.22 to about 0.28, a free energy of a liquid crystal layer 190 (of FIG. 3) is symmetrically changed with respect to a twist angle and has minimum values, i.e., bi-stable states at twist angles of about 0° and about 180°. Accordingly, the liquid crystal layer 190 of the reflective BCSN mode LCD device 100 has a stable memory property where the splay state and the π-twist state are stably kept at twist angles of about 0° and about 180°, respectively, for a relatively long time without supply of applied voltages.

In FIG. 5B, when the reflective BCSN mode LCD device 100 has a ratio d/p of cell gap d to pitch p greater than about 0.28, a free energy of the liquid crystal layer 190 is asymmetrically changed with respect to a twist angle such that the free energy at the twist angle of about 180° is lower than the free energy at the twist angle of about 0°. As a result, the π-twist state at the twist angle of about 180° is further stabilized, while the splay state at the twist angle of about 0° is further destabilized. Accordingly, the liquid crystal layer 190 may not transition from the π-twist state to the splay state even when the horizontal electric field is generated between the second and third electrodes 173 and 175 (of FIG. 3).

Further, when the reflective BCSN mode LCD device 100 has a ratio d/p of cell gap d to pitch p smaller than about 0.22, a free energy of the liquid crystal layer 190 is asymmetrically changed with respect to a twist angle such that the free energy at the twist angle of about 180° is higher than the free energy at the twist angle of about 0°. As a result, the π-twist state at the twist angle of about 180° is further destabilized, while the splay state at the twist angle of about 0° is further stabilized. Accordingly, the liquid crystal layer 190 may automatically transition from the π-twist state to the splay state even when the horizontal electric field is not generated between the second and third electrodes 173 and 175.

Therefore, the reflective BCSN mode LCD device 100 is required to have a ratio d/p of cell gap d to pitch p within a range of about 0.22 to about 0.28 for stable transition between the bi-stable states. In other words, the reflective BCSN mode LCD device 100 is required to have a uniform cell gap d of the liquid crystal layer 190 and a uniform pitch p of the BCSN liquid crystal molecules. Since the pitch p is determined by the amount of the chiral dopants added to the nematic liquid crystal molecules, the uniform pitch p may be obtained by adjusting the amount of the chiral dopants. However, the cell gap d, i.e., the thickness of the liquid crystal layer 190 may vary due to fabrication margin for the reflective BCSN mode LCD device 100.

In the reflective BCSN mode LCD device, specifically, when the first to third electrodes are formed on the reflecting plate having the embossing pattern, the step differences may be generated in the display area due to the height difference of the embossing pattern and the liquid crystal layer may have a cell gap variation according to a position in the display area. As a result, the ratio d/p of cell gap d to pitch p may vary according to a position and the BCSN liquid crystal molecules unstably transition from the π-twist state to the splay state.

Figure 6:
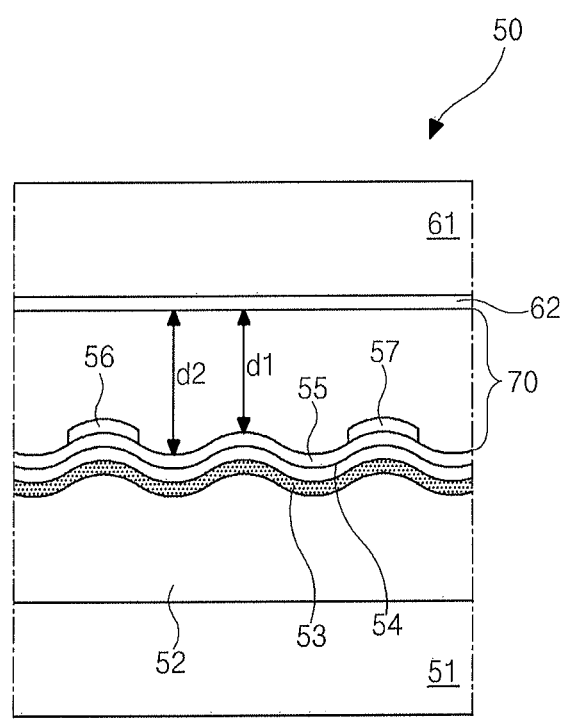
FIG. 6 is a cross-sectional view showing a reflective bi-stable chiral splay nematic mode liquid crystal display device according to a comparison example.

FIG. 6 is a cross-sectional view showing a reflective bi-stable chiral splay nematic mode liquid crystal display device according to a comparison example. In FIG. 6, a reflective bi-stable chiral splay nematic (BCSN) mode liquid crystal display (LCD) device 50 includes first and second substrates 51 and 61 and a liquid crystal layer 70 between the first and second substrates 51 and 61. A thin film transistor (TFT) (not shown) is formed on an inner surface of the first substrate 51 and a second passivation layer 52 is formed on the TFT. The second passivation layer 52 has an uneven pattern on a top surface thereof. In addition, a reflecting plate 53 having an embossing pattern is formed on the second passivation layer 52 and a first electrode 54 is formed on the reflecting plate 53. A fifth passivation layer 55 is formed on the first electrode 54 and second and third electrodes 56 and 57 are formed on the fifth passivation layer 55. A fourth electrode 62 is formed on an inner surface of the second substrate 61. For convenience of illustration, a first passivation layer between the TFT and the second passivation layer 52 and a third passivation layer between the second passivation layer 52 and the reflecting plate 53 are omitted.

Here, since the first electrode 54 is formed directly on the second passivation layer 52 without a fourth passivation layer, step differences due to the embossing pattern of the reflecting plate 53 are generated in the first electrode 54, the fifth passivation layer 55, the second electrode 56 and the third electrode 57. Accordingly, the liquid crystal layer 70 has a first thickness, i.e., a first cell gap d1 corresponding to a convex portion of the embossing pattern and a second thickness, i.e., a second cell gap d2 greater than the first cell gap d1 corresponding to a concave portion of the embossing pattern. As a result, the reflective BCSN mode LCD device 50 has a cell gap variation (d1≠d2) according to a position in a display area.

For example, the convex and concave portions of the embossing pattern of the reflecting plate 53 may have a height difference of about 0.5 μm to about 1.5 μm and the liquid crystal layer 70 may have an average thickness of about 3 μm to about 5 μm. As a result, the liquid crystal layer 70 of the reflective BCSN mode LCD device 50 without a fourth passivation layer for planarization may have a thickness variation, i.e., a cell gap variation of about 1/10 to about 1/2 of the average thickness. For example, when the average thickness of the liquid crystal layer 70 is about 4 μm, the cell gap may be within a range of about 2.5 μm to about 5.5 μm. Therefore, in the reflective BCSN mode LCD device without a fourth passivation layer for planarization, the ratio d/p of cell gap d to pitch p varies according to the position in the display area and a stable memory property is not obtained.

In the reflective BCSN mode LCD device 100 (of FIGS. 2 and 3) according to the first embodiment, since the fourth passivation layer 160 is formed on the reflecting plate 155 having the embossing pattern for planarization and the first, second and third electrodes 166, 173 and 175 are formed on the fourth passivation layer 160, the liquid crystal layer 190 has a uniform thickness, i.e., a uniform cell gap through the whole display area. As a result, the reflective BCSN mode LCD device 100 is stably driven both in the splay state and the π-twist state of the liquid crystal layer 190.

The fourth passivation layer 160 may have a surface height difference smaller than about 0.4 μm based on fabrication error margin. For example, when the average thickness of the liquid crystal layer 190 is about 4 μm and the pitch of the BCSN liquid crystal molecules is about 16 μm, the cell gap may be within a range of about 3.6 μm to about 4.4 μm and the ratio d/p of cell gap d to pitch p may be within a range of about 0.225 to about 0.275. Therefore, the liquid crystal layer 190 stably transitions between the splay state and the π-twist state and the reflective BCSN mode LCD device 100 is driven to have a stable memory property.

Figure 7:
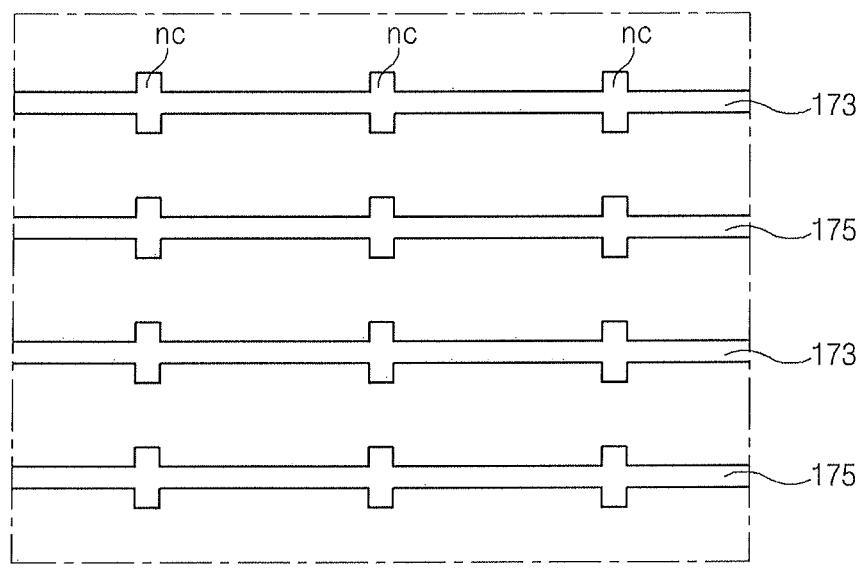
FIG. 7 is a plan view showing an array substrate for a reflective bi-stable chiral splay nematic mode liquid crystal display device according to a second embodiment of the present invention.

FIG. 7 is a plan view showing an array substrate for a reflective bi-stable chiral splay nematic mode liquid crystal display device according to a second embodiment of the present invention.

In FIG. 7, each of second and third electrodes 173 and 175 has a notch structure where a plurality of notch portions nc spaced apart from each other perpendicularly protrude from both sides of a straight line shape. When second and third voltages are applied to the second and third electrodes 173 and 175, respectively, a horizontal electric field is generated. Since the horizontal electric field is modified by the plurality of notch portions nc, a twist speed of bi-stable chiral splay nematic (BCSN) liquid crystal molecules increases and a transition speed from a π-twist state to a splay state is improved.

Figure 8:
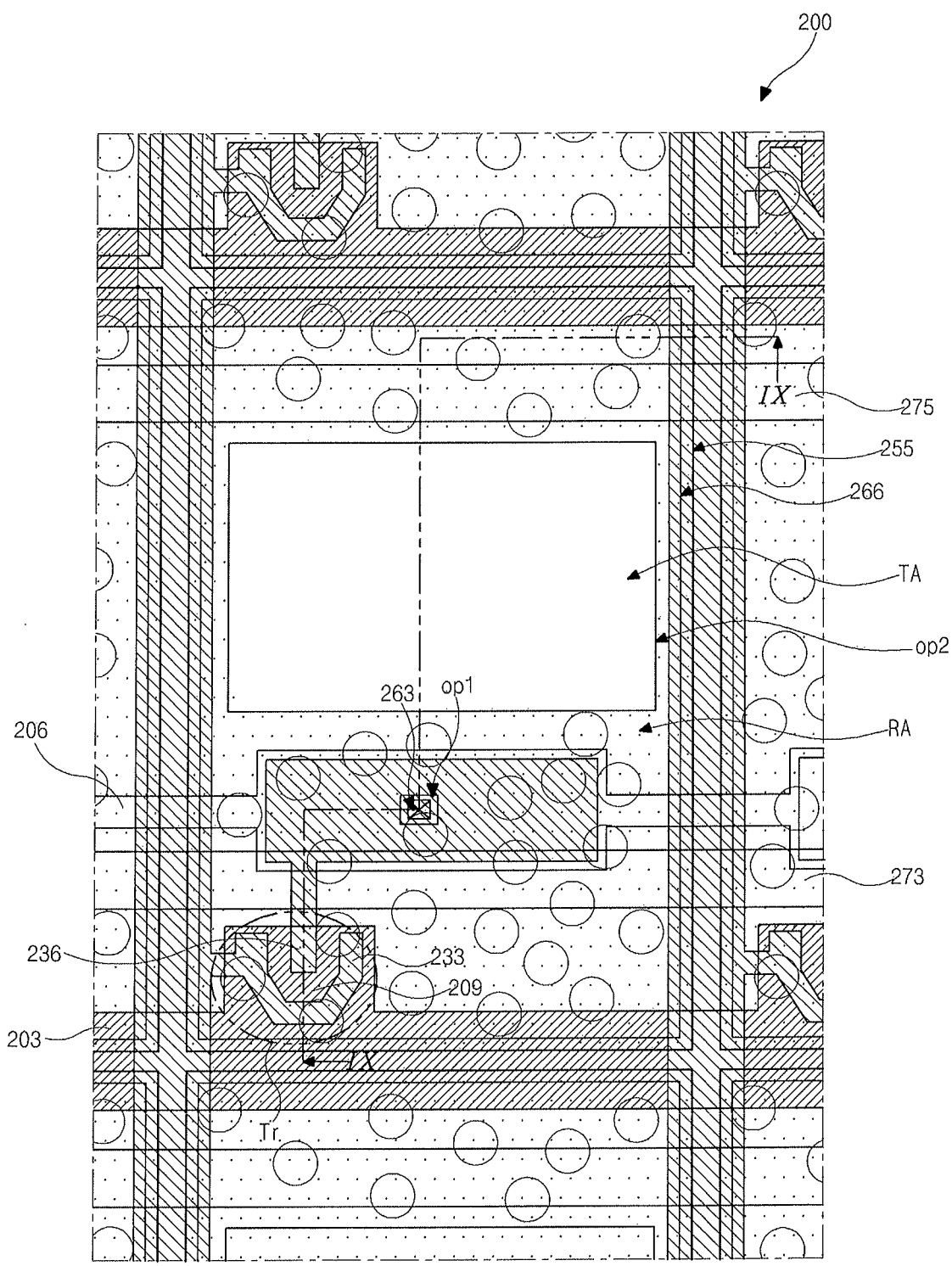
FIG. 8 is a plan view showing a transflective bi-stable chiral splay nematic mode liquid crystal display device according to a third embodiment of the present invention.
Figure 9:
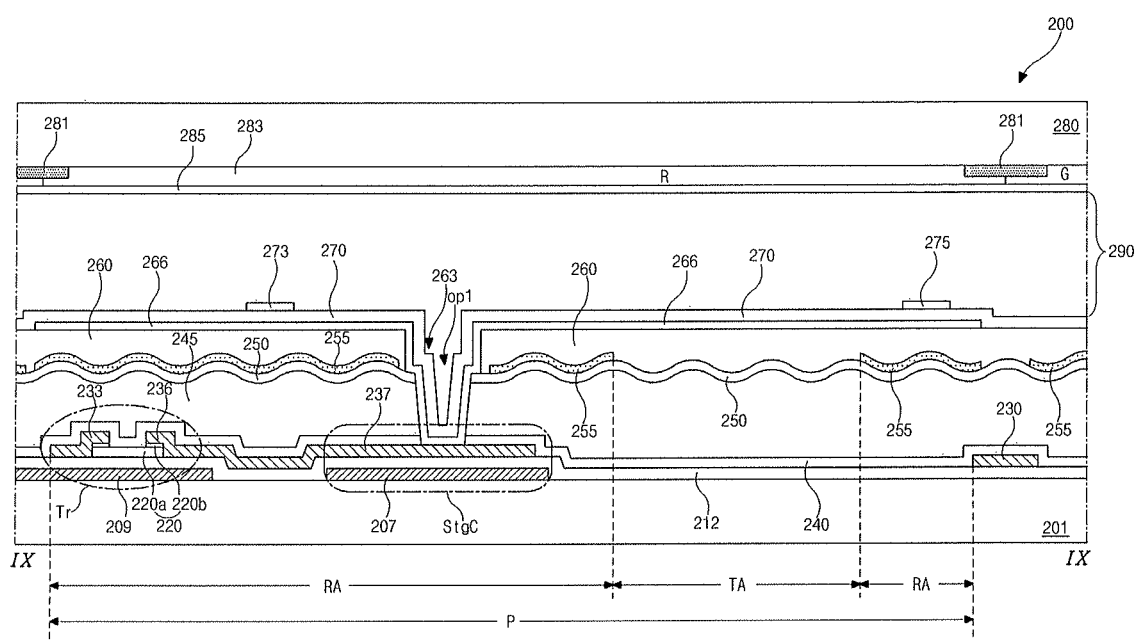
FIG. 9 is a cross-sectional view taken along line IX-IX of FIG. 8.

FIG. 8 is a plan view showing a transflective bi-stable chiral splay nematic mode liquid crystal display device according to a third embodiment of the present invention, and FIG. 9 is a cross-sectional view taken along line IX-IX of FIG. 8.

In FIGS. 8 and 9, a transflective bi-stable chiral splay nematic (BCSN) mode liquid crystal display (LCD) device 200 includes a first substrate 201, a second substrate 280 and a liquid crystal layer 290 between the first and second substrates 201 and 280. The first and second substrates 201 and 280 facing and spaced apart from each other include a plurality of pixel regions P. Each pixel region P includes a transmissive area TA and a reflective area RA surrounding the transmissive area TA. A thin film transistor Tr, a first electrode 266, a second electrode 273, a third electrode 275 and a reflecting plate 255 having an embossing pattern are formed on an inner surface of the first substrate 201, and a fourth electrode 285 is formed on an inner surface of the entire second substrate 280. The reflecting plate 255 is formed to correspond to the reflective area RA and includes an open portion corresponding to the transmissive area TA. In addition, the liquid crystal layer 290 includes BCSN liquid crystal molecules.

A gate line 203, a gate insulating layer 212 and a data line 230 are sequentially formed on the inner surface of the first substrate 201 of transparent glass, flexible transparent plastic or flexible transparent film. The gate line 203 and the data line 230 cross each other to define a pixel region P. A common line 206 parallel to the gate line 203 is formed on the first substrate 201. The common line 206 may be disposed to pass through the pixel region P. A portion of the common line 206 has a width greater than the other portion to constitute a first capacitor electrode 207.

The thin film transistor (TFT) Tr including a gate electrode 206, a gate insulating layer 212, a semiconductor layer 220, a source electrode 233 and a drain electrode 236 is connected to the gate line 203 and the data line 230. The gate electrode 206 is connected to the gate line 203, and the gate insulating layer 212 is formed on the gate electrode 206 and the gate line 203. The semiconductor layer 220 includes an active layer 220*a* of intrinsic silicon and an ohmic contact layer 220*b* of impurity-doped silicon. The source and drain electrodes 233 and 236 are formed on the semiconductor layer 220 and are spaced apart from each other. The source electrode 233 is connected to the data line 230, and the drain electrode 236 extends to overlap the first capacitor electrode 207. The extending portion of the drain electrode 236 overlapping the first capacitor electrode 207 functions as a second capacitor electrode 237 such that the first capacitor electrode 207, the second capacitor electrode 237 and the gate insulating layer 212 between the first and second capacitor electrodes 207 and 237 constitute a storage capacitor StgC.

A first passivation layer 240 of an inorganic insulating material is formed on the TFT Tr, the storage capacitor StgC and the data line 230, and a second passivation layer 245 of an organic insulating material is formed on the first passivation layer 240. The second passivation layer 245 has an uneven pattern on a top surface thereof. A third passivation layer 250 of an inorganic insulating material is formed on the second passivation layer 245, and the reflecting plate 255 of a metallic material is formed on the third passivation layer 250. For example, the metallic material having a relatively high reflectance may include aluminum (Al) or aluminum (Al) alloy. The reflecting plate 255 may be formed to overlap the gate line 203 and the data line 230 and may correspond to the reflective area RA. In addition, the reflecting plate 255 has an open portion corresponding to the transmissive area TA and the third passivation layer 250 is exposed through the open portion of the reflecting plate 255.

Each of the third passivation layer 250 and the reflecting plate 255 has an embossing pattern on a top surface thereof due to the uneven pattern of the second passivation layer 245. Since a mirror reflection is prevented and a reflection efficiency is improved due to the embossing pattern of the reflecting plate 255, a visibility of the transflective BCSN mode LCD device 200 is improved.

In addition, the first to third passivation layers 240, 245 and 250 have a drain contact hole 263 exposing the drain electrode 236, and the reflecting plate 255 has a first opening op1 corresponding to the drain contact hole 263.

The first passivation layer 240 of the inorganic material is formed to prevent contamination of a channel region of the active layer 220*a* and deterioration of the TFT Tr by the organic material for the second passivation layer 245. Further, the third passivation layer 250 of the inorganic material is formed to improve adhesion between the organic material for the second passivation layer 245 and the metallic material for the reflecting plate 255. Although the first to third passivation layers 240, 245 and 250 are formed on the first substrate 201 in the third embodiment, the first and third passivation layer 240 and 250 may be omitted and only the second passivation layer 245 may be formed between the TFT Tr and the reflecting plate 255 in another embodiment.

A fourth passivation layer 260 is formed on the reflecting plate 255 and the third passivation layer 250 exposed through the open portion of the reflecting plate 255 such that the fourth passivation layer 260 corresponds to the reflective area RA and the transmissive area TA. The fourth passivation layer 260 may be formed of one of an organic insulating material and an inorganic insulating material and may have a thickness greater than about 1 μm so that the fourth passivation layer 250 can function as a planarization layer having a flat top surface regardless of the step differences of the lower laminated layers. Since the step differences due to the embossing pattern of the reflecting plate 255 are planarized by the fourth passivation layer 260, the liquid crystal layer 290 has a uniform thickness.

Although not shown in FIGS. 8 and 9, when the fourth passivation layer 260 is formed of an organic insulating material, a fifth passivation layer may be formed between the reflecting plate 255 and the fourth passivation layer 260 to improve adhesion of the metallic material for the reflecting plate 255 and the organic insulating material for the fourth passivation layer 260.

The drain contact hole 263 is formed in the first to fourth passivation layers 240, 245, 250 and 260. When the fifth passivation layer is formed between the reflecting plate 255 and the fourth passivation layer 260, the drain contact hole 263 may be formed in the first to fifth passivation layers. The drain contact hole 263 corresponds to the first opening op1 of the reflecting plate 255 and exposes the second capacitor electrode 237 extending from the drain electrode 236.

The first electrode 266 of a transparent conductive material is formed on the fourth passivation layer 260. The first electrode 266 is connected to the second capacitor electrode 237 through the drain contact hole 263 and the transparent conductive material may include indium-tin-oxide (ITO) and indium-zinc-oxide (IZO). Further, the first electrode 266 has a plate shape in the pixel region P and may completely overlap the reflecting plate 255 and the open portion of the reflecting plate 255.

A sixth passivation layer 270 of an inorganic insulating material is formed on the first electrode 266, and the second and third electrodes 273 and 275 of a transparent conductive material are formed on the sixth passivation layer 270. The second and third electrodes 273 and 275 spaced apart from each other may be disposed to be parallel to the gate line 203 and pass through the pixel region P. The transparent conductive material may include indium-tin-oxide (ITO) and indium-zinc-oxide (IZO).

Although the single second electrode 273 and the single third electrode 275 are formed in each pixel region P in the third embodiment, a plurality of second electrodes and a plurality of third electrodes alternately disposed with each other may be formed in each pixel region P in another embodiment. For example, the number of the plurality of second electrodes in each pixel region P may be one of 4, 6, 8 and 10 and the number of the plurality of third electrodes in each pixel region P may be one of 4, 6, 8 and 10.

The second electrode 273 in each pixel region P of a display area may be connected to a first auxiliary line (not shown) in one side of a non-display area and a first voltage may be supplied to the second electrode 273 through the first auxiliary line. Further, the third electrode 275 in each pixel region P of the display area may be connected to a second auxiliary line (not shown) in the other side of the non-display area and a second voltage different from the first voltage may be supplied to the third electrode 275 through the second auxiliary line.

Although not shown in FIGS. 8 and 9, a first orientation film is formed on the first and second electrodes 273 and 275 and the sixth passivation layer 270 exposed through the first and second electrodes 273 and 275. The first orientation film may correspond to the entire display area.

In addition, a black matrix 281 having an open portion is formed on the inner surface of the second substrate 280. The black matrix 281 corresponds to a boundary portion of the pixel region P. For example, the black matrix 281 may correspond to the gate line 203 and the data line 230. A color filter layer 283 is formed on the black matrix 281 and the inner surface of the second substrate 280 exposed through the open portion of the black matrix 281. The color filter layer 283 may include red, green and blue color filters each corresponding to the pixel region P. The fourth electrode 285 of a transparent conductive material is formed on the color filter layer 283. The fourth electrode 285 has a flat top surface so that the step differences due to the black matrix 281 and the color filter layer 283 can be planarized. Although not shown in FIGS. 8 and 9, a second orientation film corresponding to the entire display area is formed on the fourth electrode 285.

The liquid crystal layer 290 including the BCSN liquid crystal molecules is formed between the first and second orientation films. The BCSN liquid crystal molecules may have a bi-stable property and may be formed by adding a chiral dopant to nematic liquid crystal molecules.

In the transflective BCSN mode LCD device 200, since the step differences due to the embossing pattern of the reflecting plate 255 are planarized by the fourth passivation layer 260, the liquid crystal layer 290 has a uniform thickness, i.e., a uniform cell gap and deterioration in the bi-stable property of the liquid crystal layer 290 is prevented. Therefore, the liquid crystal layer 290 stably transitions between the splay state and the π-twist state and the transflective BCSN mode LCD device 200 is driven to have a stable memory property.

Consequently, in the reflective or transflective BCSN mode LCD device according to the present invention, since the image is displayed by using the memory property of the BCSN liquid crystal molecules, the power consumption is reduced. In addition, since a backlight unit is not required, the power consumption is further reduced and the light-weight and the thin profile are obtained. Further, since the reflecting plate has the embossing pattern, reflection efficiency is improved. Moreover, since the step differences due to the embossing pattern of the reflecting plate are planarized by the fourth passivation layer, the liquid crystal layer has a uniform thickness, i.e., a uniform cell gap and a uniform ratio of cell gap to pitch. Therefore, the liquid crystal layer stably transitions between the splay state and the π-twist state and the stable memory property is obtained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A bi-stable chiral splay nematic mode liquid crystal display device, comprising:
   first and second substrates facing and spaced apart from each other, the first and second substrates including a display area and a non-display area surrounding the display area;
   a gate line and a data line on an inner surface of the first substrate, the gate line and the data line crossing each other with a gate insulating layer interposed between the gate line and the data line to define a pixel region;
   a thin film transistor connected to the gate line and the data line;
   a reflecting plate on the thin film transistor, the reflecting plate including an embossing pattern;
   a first passivation layer on the reflecting plate, the first passivation layer including a flat top surface, the first passivation layer having a thickness greater than about 1 μm;
   a first electrode on the first passivation layer in the pixel region, the first electrode having a plate shape and connected to the thin film transistor;
   a second passivation layer on the first electrode;
   at least one second electrode and at least one third electrode on the second passivation layer, the at least one second electrode and the at least one third electrode passing through the pixel region and spaced apart from each other;
   a fourth electrode on an inner surface of the second substrate; and
   a liquid crystal layer between the first and second substrates, the liquid crystal layer including bistable chiral splay nematic liquid crystal molecules,
   further comprising:
   a third passivation layer of an organic insulating material between the thin film transistor and the reflecting plate, wherein the third passivation layer includes an uneven pattern corresponding to the embossing pattern on a top surface thereof;
   a fourth passivation layer of an inorganic insulating material between the thin film transistor and the third passivation layer, the fourth passivation layer preventing a contamination and a deterioration of the thin film transistor by the organic insulating material for the third passivation layer; and
   a fifth passivation layer of an inorganic insulating material between the third passivation layer and the reflecting plate, the fifth passivation layer improving an adhesion between the third passivation layer and the reflecting plate,
   wherein each of the at least one second electrode and the at least one third electrode is parallel to the gate line,
   wherein each of the at least one second electrode and the at least one third electrode includes a plurality of notch portions protruding from both sides of each of the at least one second electrode and the at least one third electrode, and
   wherein the plurality of notch portions of the at least one second electrode face the plurality of notch portions of the at least one third electrode.

2. The device according to claim 1, wherein the pixel region includes a reflective area and a transmissive area, and the reflecting plate includes an open portion corresponding to the transmissive area.

3. The device according to claim 1, wherein the at least one second electrode includes a plurality of second electrodes and the at least one third electrode includes a plurality of third electrodes, and wherein the plurality of second electrodes are alternately disposed with the plurality of third electrodes in the pixel region.

4. The device according to claim 1, further comprising first and second auxiliary lines in both sides, respectively, of the non-display area, wherein the at least one second electrode is connected to the first auxiliary line and the at least one third electrode is connected to the second auxiliary line.

5. The device according to claim 1, wherein each of the first to fourth electrodes includes a transparent conductive material.

6. The device according to claim 1, further comprising a common line parallel to the gate line and a first capacitor electrode extending from the common line, wherein the common line has a same layer as the gate line, wherein the common line is parallel to the at least one second electrode and the at least one third electrode, and wherein a second capacitor electrode extends from a drain electrode of the thin film transistor to overlap the first capacitor electrode such that the first capacitor electrode, the second capacitor electrode and the gate insulating layer between the first and second capacitor electrodes constitute a storage capacitor.

7. The device according to claim 1, wherein the reflecting plate has a first opening corresponding to the drain electrode, wherein the first to fourth passivation layers have a drain contact hole exposing the drain electrode and corresponding to the first opening, and wherein the first electrode is connected to the drain electrode through the drain contact hole.

8. The device according to claim 1, wherein the bi-stable chiral splay liquid crystal molecules include nematic liquid crystal molecules and chiral dopants, and wherein a ratio d/p of cell gap to pitch of the liquid crystal layer is within a range of about 0.22 to about 0.28 when a cell gap of the liquid crystal layer is d and a pitch of the bi-stable chiral splay nematic liquid crystal molecules is p.

9. The device according to claim 1, further comprising a first orientation film on the second and third electrodes and a second orientation film on the fourth electrode, wherein the first and second orientation films are aligned to have a same orientation direction.

10. The device according to claim 9, wherein the liquid crystal layer has a splay state as an initial state when the first to fourth electrodes are floating, wherein the liquid crystal layer has a bend state when first and fourth voltages are applied to the first and fourth electrodes, respectively, to generate a vertical electric field, wherein the liquid crystal layer has a π-twist state when the first and fourth electrodes are floating at the bend state, wherein the liquid crystal layer has the splay state when second and third voltages are applied to the second and third electrodes to generate a horizontal electric field at the π-twist state, and wherein a free energy of the liquid crystal layer has minimum values at the splay state and the π-twist state such that the splay state and the π-twist state are kept without continuous applied voltages.

11. The device according to claim 1, further comprising a color filter layer between the second substrate and the fourth electrode.

12. The device according to claim 11, further comprising a black matrix corresponding to a boundary portion of the pixel region between the second substrate and the color filter layer.

13. The device according to claim 1, wherein the first passivation layer includes an organic insulating material.

14. The device according to claim 13, further comprising a sixth passivation layer of an inorganic insulating material between the reflecting plate and the first passivation layer.

* * * * *